United States Patent
Little (10) Patent No.: US 11,267,112 B2
(45) Date of Patent: Mar. 8, 2022

(54) INSTALLATION APPARATUS FOR MOUNTING A GARNISH ONTO A VEHICLE STRUCTURE AND METHODS OF MAKING AND USING THE SAME

(71) Applicant: Honda Motor Co., Ltd., Tokyo (JP)

(72) Inventor: Michael Sean Little, Batesville, IN (US)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/842,333

(22) Filed: Apr. 7, 2020

(65) Prior Publication Data
US 2021/0308847 A1 Oct. 7, 2021

(51) Int. Cl.
B25B 27/00 (2006.01)
B60R 13/04 (2006.01)

(52) U.S. Cl.
CPC .......... *B25B 27/0035* (2013.01); *B60R 13/04* (2013.01)

(58) Field of Classification Search
CPC . B25B 27/00; B25B 27/0028; B25B 27/0035; B25B 27/0092; B25B 27/02; Y10T 29/53709; Y10T 29/53787; Y10T 29/53791; Y10T 29/53909; Y10T 29/53943; Y10T 29/53991; B23P 19/047; B60J 10/45
See application file for complete search history.

(56) References Cited

U.S. PATENT DOCUMENTS

| | | | |
|---|---|---|---|
| 5,794,322 A | 8/1998 | Issagholian-Havai | |
| 6,189,191 B1 | 2/2001 | Vuorinen | |
| 6,957,478 B1 | 10/2005 | Ontiveros | |
| 7,089,834 B2 * | 8/2006 | Reynertson | B25B 23/14 |
| | | | 73/862.23 |
| 7,222,404 B1 | 5/2007 | Lindsey et al. | |
| 8,365,378 B1 | 2/2013 | Lenart | |

FOREIGN PATENT DOCUMENTS

| | | | |
|---|---|---|---|
| DE | 102013002538 A1 | 3/2014 | |
| FR | 2818179 A1 * | 6/2002 | ......... B25B 27/0092 |
| FR | 2987594 A1 | 9/2013 | |
| JP | H08133147 A | 5/1996 | |
| JP | 3128977 U | 2/2007 | |

* cited by examiner

Primary Examiner — Tyrone V Hall, Jr.
(74) Attorney, Agent, or Firm — Kenealy Vaidya LLP (57) ABSTRACT

An installation apparatus for mounting a garnish having at least one attachment element onto a pillar frame structure of a vehicle can include a handle portion and a J-shaped portion located at one end of the handle portion. The J-shaped portion can include a shorter member configured to engage the vehicle from a bottom area of the pillar frame structure to create a hinge point, and a longer member configured to engage the garnish and attachment structure. The garnish can be installed to the pillar frame structure when pivoting the handle of the apparatus about the hinge point downward and towards an interior of the vehicle.

20 Claims, 6 Drawing Sheets

FIG. 5D

INSTALLATION APPARATUS FOR MOUNTING A GARNISH ONTO A VEHICLE STRUCTURE AND METHODS OF MAKING AND USING THE SAME

BACKGROUND

The disclosed subject matter relates to apparatus and methods for mounting a garnish onto a vehicle structure. More particularly, the disclosed subject matter relates to methods and apparatus for installing a clip that mounts a garnish to a vehicle structure, and that can verify that the garnish is positioned and secured to the vehicle structure in accordance with a desired specification.

Vehicles can include one or more aesthetic members mounted on structure of the vehicle and located in the passenger compartment of the vehicle. The aesthetic member can have a predetermined coloring and surface texture that can be aesthetically pleasing to an occupant of the vehicle. The purpose for the aesthetic member may be to cover or conceal one or more structural portions, components and/or systems of the vehicle from view of the occupant(s) of the vehicle, and to provide a finished look to the interior of the vehicle. The aesthetic member can be referred to as a trim panel, a trim piece, a trim garnish, a garnish, escutcheon or other.

For example, a pillar garnish can be mounted onto an A-pillar (or other pillar) of a vehicle to cover the metal pillar and conceal from view various components including the interior of the pillar and possibly wiring, seals, welds, an airbag assembly, a seatbelt retractor assembly, or other components located adjacent or within the pillar. In another example, a trim panel can be connected to a door or other interior component of the vehicle in order to conceal structures, such as a window regulator, a door lock mechanism, electrical wiring, seat attachment structures, and other structures.

The aesthetic member can be connected to the structural member of the vehicle or to another aesthetic member by any appropriate attachment element such as but not limited to a threaded fastener, a rivet, a plastic clip, a snap fastener, or any combination thereof. The attachment element can be secured to a side of the aesthetic member that is concealed from view by an occupant of the vehicle in any appropriated manner such as but not limited to welding, staking, adhesive, integrally molding with the aesthetic member, insert-molding onto the aesthetic member, or any combination thereof.

In many cases, robotic arms are used to attach the garnish or trim piece to the vehicle frame structure. However, there are cases in which robotic applications are not feasible due to malfunctioning equipment, space requirements, cost, etc. In such cases, it may be helpful to have a tool that assists a person when installing a clip onto a vehicle frame structure to secure the garnish or trim panel, etc. Thus, the disclosed subject matter is directed to embodiments of a tool and process for carrying out this attachment function.

SUMMARY

Some embodiments are directed to an installation apparatus for mounting a garnish having at least one attachment element onto a pillar frame structure of a vehicle. The installation apparatus can include a handle portion and a J-shaped portion located at one end of the handle portion and configured to install the attachment element onto the pillar frame structure of the vehicle. The J-shaped portion can include a shorter member configured to engage the vehicle from a bottom area of the pillar frame structure to create a hinge point. The J-shaped portion can also include a longer member configured to engage the garnish and attachment element, wherein the garnish is installed to the pillar frame structure when pivoting the handle of the apparatus about the hinge point.

According to another embodiment of the disclosed subject matter, a method for installing a garnish onto an pillar frame structure of a vehicle by using the installation apparatus described above can include providing the installation apparatus and placing the J-shaped portion into an opening in the vehicle. The method can further include connecting the shorter member of the J-shaped portion to a lower portion of the pillar frame structure to create the hinge point between the J-shaped portion and the pillar frame structure. The method can also include rotating the handle of the installation apparatus such that the longer member contacts the garnish and causes the attachment structure to connect to a mating structure located between the pillar frame structure and the garnish to secure the garnish to the pillar frame structure, wherein rotating the handle includes rotating the handle towards an interior of the vehicle via the opening.

According to yet another embodiment of the disclosed subject matter an installation kit for mounting a garnish onto an A-pillar of a vehicle can include a garnish configured to mount onto the A-pillar. An attachment structure can be configured to attach the garnish to the A-pillar. The kit can include an installation apparatus having, a handle, and a J-shaped tool located at one end of the handle and configured to install the attachment element onto the A-pillar of the vehicle. The J-shaped tool can include a shorter member configured to engage the A-pillar from a bottom area of the A-pillar to create a hinge point, and a longer member configured to engage the garnish and attachment element. The garnish is installed to the A-pillar when pivoting the handle of the installation apparatus about the hinge point.

According to another embodiment of the disclosed subject matter, an installation apparatus for mounting a garnish having at least one attachment structure onto an A-pillar frame structure of a vehicle can include a handle portion and a J-shaped portion located at one end of the handle portion. The J-shaped portion can be configured to install the attachment structure onto the A-pillar frame structure of the vehicle, wherein the J-shaped portion includes a trough member, a shorter member extending from one end of the trough member and configured to engage the vehicle from a bottom area of the A-pillar frame structure to create a hinge point, and a longer member extending from an opposite end of the trough member and configured to engage the garnish and attachment structure. The garnish is installed to the A-pillar frame structure when pivoting the handle of the apparatus about the hinge point. The longer member of the J-shaped portion can extend substantially perpendicularly from the trough member, and the shorter member of the J-shaped portion can extend substantially perpendicularly from the trough member. The shorter member can be connected to the trough member at a first end of the shorter member, and terminate at a second end. The second end can include a concave surface that faces the longer member such that a grab lip is located at the second end of the shorter member and faces the longer member.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
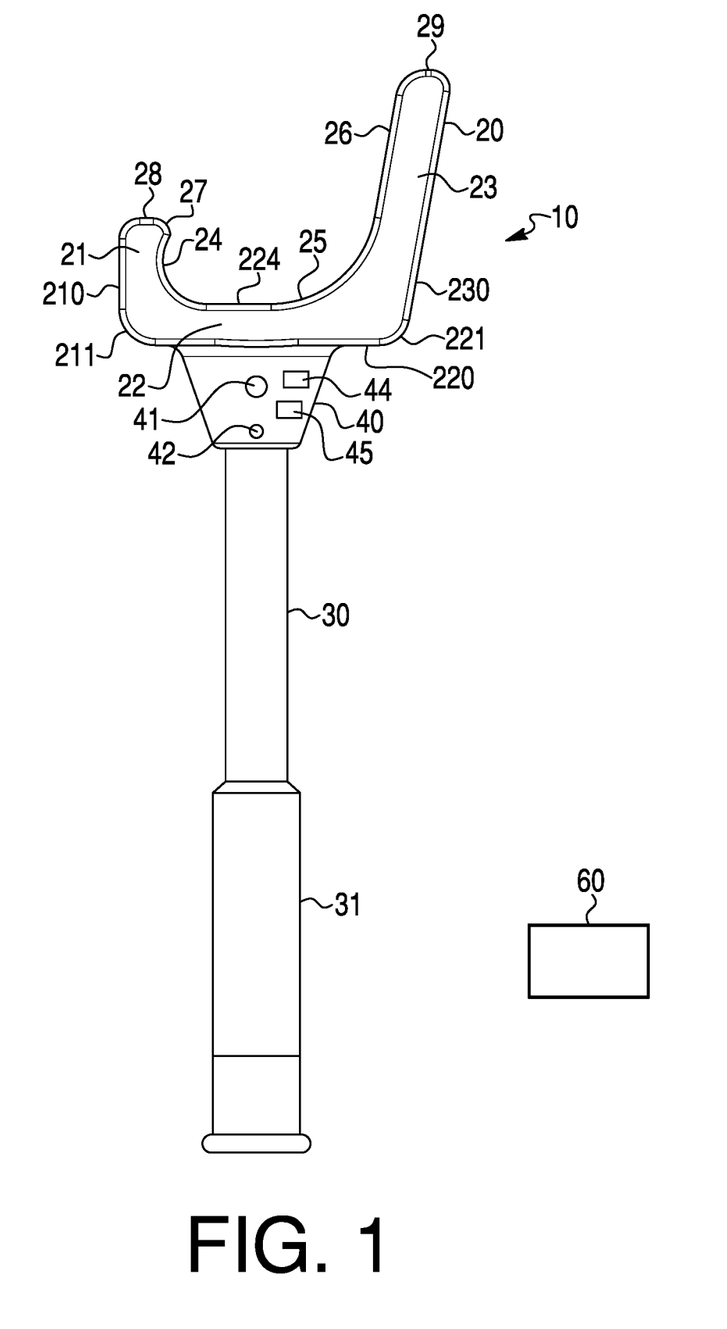
FIG. 1 is a side view of an installation apparatus made in accordance with principles of the disclosed subject matter.

FIG. 1 depicts an exemplary embodiment of a tool 10 for installing an aesthetic member, such as a garnish 120, to a vehicle 100. The tool 10 includes a handle 30 that terminates at a proximal end at a grip 31 configured to be held by the user. The grip 31 can be a rubber or other material that has a higher frictional characteristic as compared to other parts of the handle 30. The grip 31 can also include ergonomic features such as curvatures for placement of the fingers of a user. The distal end of the handle 30 can be connected to connection structure 40 that is configured to connect the handle 30 to the tool head 20. In this exemplary embodiment, the connection structure 40 can include a sensor 44 for sensing or measuring at least one of force and torque applied or transmitted from the handle 30 to the tool head 20. The connection structure 40 can also include a communication device 45 located therein or thereon for communicating data from the sensor 44 to a controller 60, such as a server, computer, programmable logic controller, or other control device located at a distance from the tool 10. For example, the communication device 45 can be a wireless transmission device configured to transmit information via wireless transmission protocol to the controller 60. Although the sensor 44 and communication device 45 are shown as located in the connection structure 40, it should be understood that either one or both of the sensor 44 and communication device 45 can be located at other locations on the tool 10, including in the tool head 20 or tool handle 30.

Figure 4A:
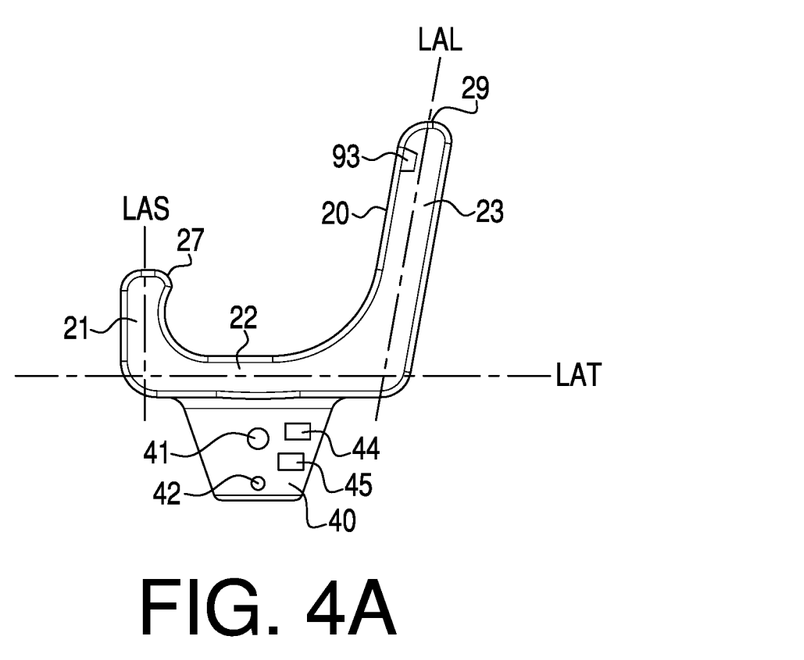
FIGS. 4A-D are a side view, bottom view, front view and side perspective view of a working portion of the installation apparatus of FIG. 1.
Figure 4B:
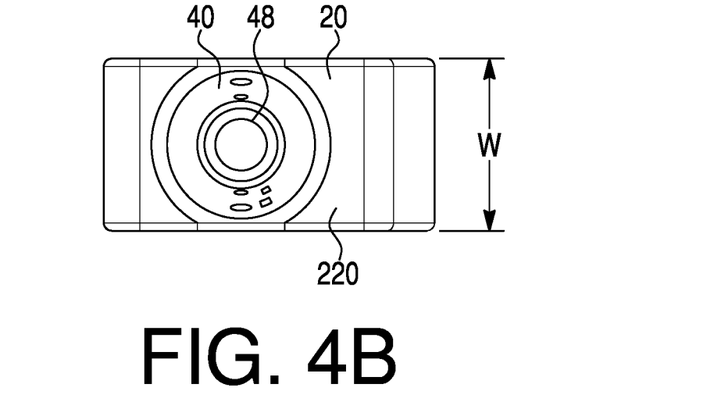
Figure 4C:
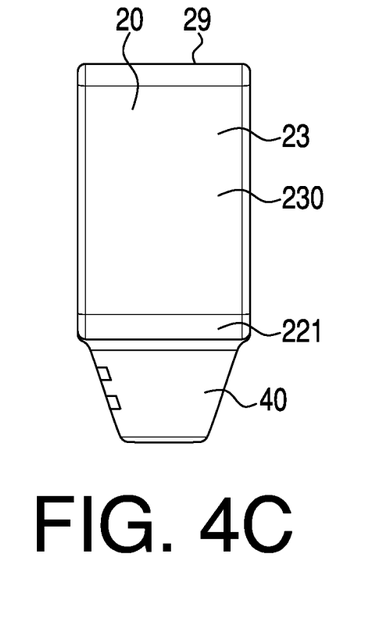

The tool head 20 can be a J-shaped structure that has a shorter member 21 connected to a longer member 23 via a trough member 22. Each of the shorter member 21, longer member 23, and trough member 22 can have a longitudinal axis LAS, LAL, LAT, respectively (See FIG. 4A), that extend in a same plane. The longitudinal axis LAS of the short member 21 can be substantially perpendicular (i.e., perpendicular or almost perpendicular) to the longitudinal axis LAT of the trough member 22. The longitudinal axis LAL of the longer member 23 can also be substantially perpendicular (i.e., perpendicular or almost perpendicular) to the longitudinal axis LAT of the trough member 22. However, as shown in FIG. 4A, the longitudinal axis LAL of the longer member 23 can extend at an angle slightly greater than ninety degrees away from the trough member 22 (and slightly off parallel and away from the longitudinal axis LAS of shorter member 21).

The shorter member 21 can extend from the trough member 22 to a distal end 28. An exterior surface 210 of the shorter member 21 can be a flat surface that is linear in cross section (parallel with the longitudinal axis LAS) and extends from a convex lowermost surface 211 that mates with the trough member 22 to a convex surface at distal end 28 of the shorter member 21. Likewise, an exterior surface 230 of the longer member 23 can be a flat surface that is linear in cross section (and parallel with the longitudinal axis LAL) and can extend from a lowermost convex surface 221 that mates with the trough member 22 to a convex surface at distal end 29 of the longer member 23.

A concave interior surface 24 can extend continuously from the trough member 22 to a grab lip 27 located immediately adjacent a convex surface that forms the distal end 28. The grab lip 27 is formed at the intersection of the concave interior surface 24 and convex surface of distal end 28 (i.e., where the relative slope of the line in cross section changes from positive to negative of the respective surfaces 24, 28). The concave interior surface 24 faces towards the longer member 23, and eventually connects with a flat surface that forms the middle interior surface 224 portion of trough member 22. A concave interior surface 25 of the longer member 23 can extend from the flat interior surface 224 of the trough member 22 to a flat interior surface 26 of the longer member 23. The flat interior surface 26 can extend to a convex distal end 29 of the longer member 23.

Figure 2:
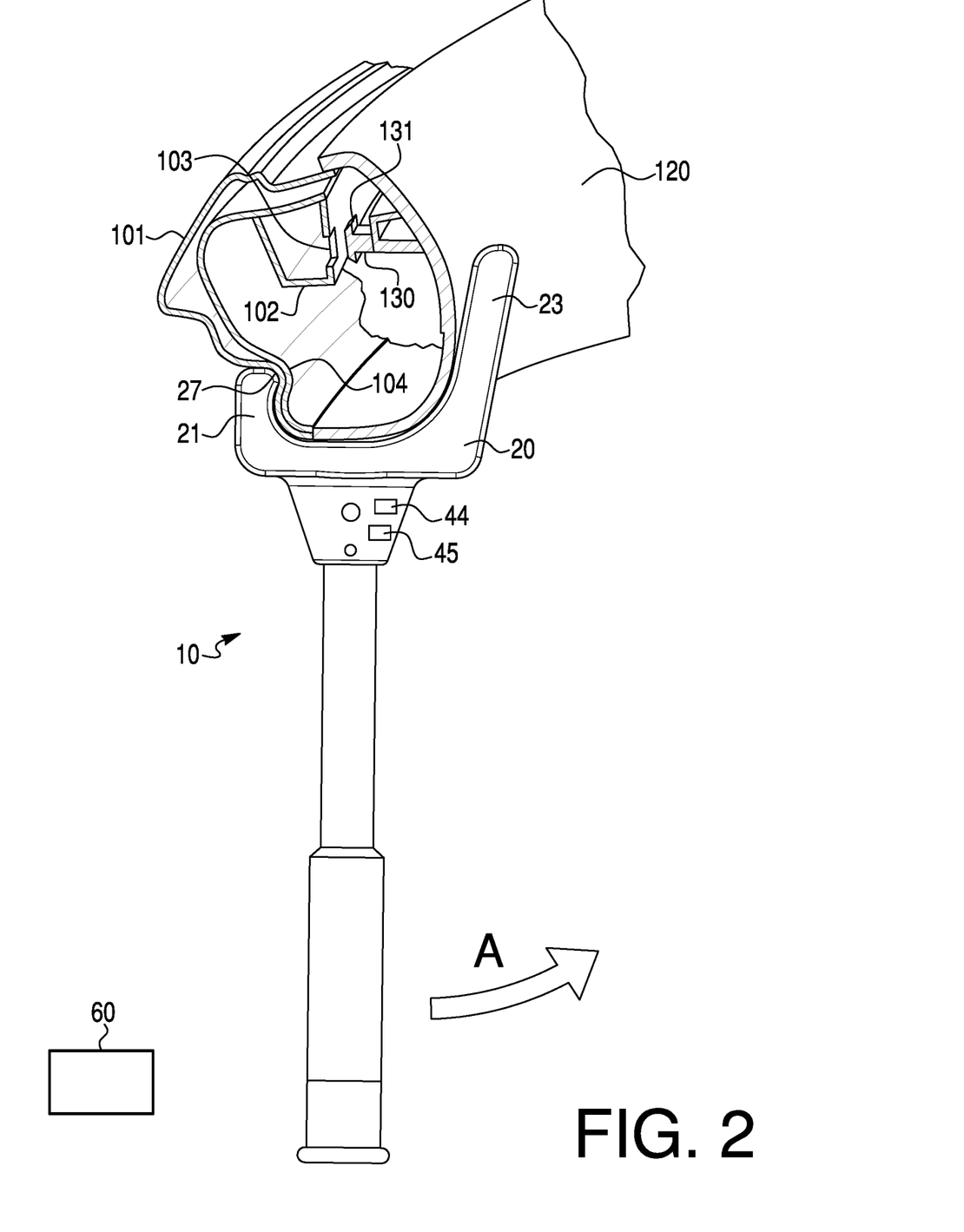
FIG. 2 is a perspective view of the installation apparatus of FIG. 1 in operation in a window opening of a vehicle with a cross-section of the A-pillar of the vehicle.

FIG. 2 shows the tool 10 in use to install an aesthetic member to a vehicle 100. The aesthetic member can be in the form of a garnish 120 formed to fit onto an interior surface of the A-pillar 101 of the vehicle 100. The A-pillar 101 can include a mating element 102 that has an opening 103 into which an attachment element 130 of the garnish 120 can be inserted for attachment thereto. The attachment element 130 can be a single use type of structure that includes a plastically deformable or expandable structure 131 at a distal end that either elastically or plastically deforms when inserted into opening 103 (or other mating structure in pillar 101) to permanently lock the garnish 120 to the pillar 101. As shown in FIG. 2, the expandable structure 131 can be formed as wing like elements that collapse during insertion into the opening 103 and then expand once inside the mating element 102 to secure the attachment element 130 (and associated garnish 120) to the A-pillar 101 frame structure. The mating element 102 can be presented or formed in various manners including welding a box like metal structure onto an interior surface of the A-pillar 101. Alternatively, the mating element can be clipped, attached or adhered to the interior surface of the A-pillar 101, and can be made from plastic, ceramic, metal, or other material. Likewise, the attachment element 130 can be made from metal, plastic, ceramics, combinations thereof, etc.

In use, the grab lip 27 of the tool 10 is placed onto a lip or other mounting or pivot structure 104 of the pillar 101, and the garnish 120 is loosely placed between the pillar 101 and in the J-shaped opening of the tool head 20. The handle 30 of tool 10 is then rotated downward into an area underneath the pillar 101, such as a window opening 110 of the vehicle frame, in a direction denoted by arrow A. During rotation, the grab lip 27 acts as a hinge point against (and/or locked into) pivot structure 104, and the longer member 23 (and to a lesser extent the trough member 22) of the tool head 20 rotates into and eventually contacts the outer surface of the garnish 120 to force the garnish 120 and associated attachment element 130 towards the pillar 101. Once attachment element 130 of the garnish 120 comes into contact with the mating element 102 of the pillar 101, further rotation of tool 10 will transfer an amount of force and/or torque to the garnish 120 and attachment element 130 causing the attachment element 130 to permanently connect with the mating element 102 when a predetermined amount of force/and or torque is applied.

Specifically, the tool 10 can install an A-pillar garnish clip by using the vehicle 100 as a hinge point in order to improve the ergonomics of the installation procedure and reduce stress on the user performing the procedure. The tool 10 can include a hook-like end defining the distal end 28 of shorter member 21 that engages with the vehicle 100 in order to use the distal end 28 of shorter member 21 as a hinge point. Torque is manually applied to the tool 10 to force an attachment element 130 (for example, a onetime clip), which mounts the garnish 120, into position onto pillar 101. The tool 10 and associated method of use can reduce stress of and improve ergonomics for a user because the user's arms and hands can remain below his/her shoulders during use (the handle 30 is located below the A-pillar and the user pushes the handle 30 into an opening such as a window opening 110 under the A-pillar during use). The tool 10 and method can also reduce the possibility of getting weld slag into the user's gloves because of the positioning of the tool 10 during use. A stop ship system, as explained in greater detail below, can also be used with the tool 10 to confirm the attachment element 130 such as a clip was set, leading to an improvement in quality to the customer.

The tool 10 can include a sensor 44 configured to sense data related to at least one of torque and force applied by the tool 10 to the garnish 120. A communication device 45 can also be included on the tool 10 to communicate the data sensed by sensor 44 to a controller 60. The data can arrive at the controller 60 in the form of torque and/or force information, or the controller 60 can be configured to calculate torque and/or force information from the data received from communication device 45. At least one of the controller 60, sensor 44, and communication device 45 can be configured to provide an audible (for example, using a speaker), visual (for example, using a light), haptic (for example, using a vibrator), or other sensory cue to let a user know whether a correct and/or incorrect amount of force and/or torque has been applied to the garnish 120 in order to complete the attachment process to the pillar 101. In addition, or alternatively, the controller 60 can be used to log in the amount of force/and or torque applied to the garnish 120 for each application (or possibly for each vehicle). If the force and/or torque information falls above or below a pre-set limit(s), the controller 60 can cause the vehicle 100 or garnish 120 to be tagged for further inspection and/or additional attachment procedures at another location during production of the vehicle 100.

The sensor 44 can be any appropriate sensor such as but not limited to a strain gauge, a piezoelectric sensor, a capacitive load cell, a force sensing resistor that can output an electrical signal that is proportional to the force or torque applied to the sensor. As noted above, the installation tool 10 can include a controller 60. The controller 60 can be in electrical communication with the sensor 44. For example, communication device 45 can include electrical wires that run from the force/torque sensor 44 to the controller 60. Alternatively, communication device 45 can include a wireless communication system for communicatively connecting the controller 60 to the force/torque sensor 44.

Figure 3A:
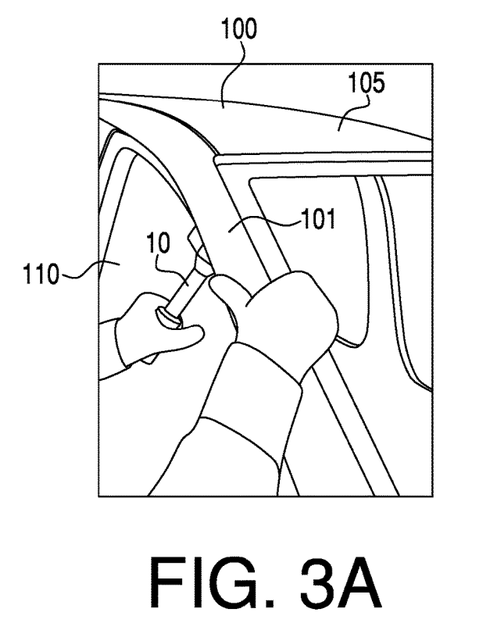
FIGS. 3A and 3B are perspective views of the installation apparatus of FIG. 1 in use.
Figure 3B:
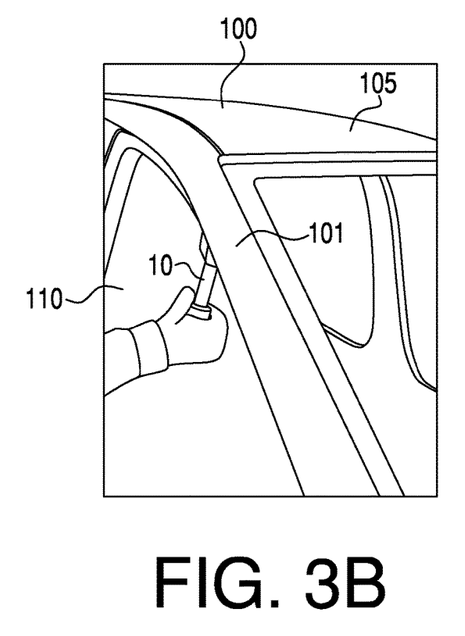

FIGS. 3A and 3B show a user rotating the tool 10 downwards and into a window opening 110 underneath both the A-pillar 101 and roof 105 of the vehicle 100. As shown, the handle 30 of tool 10 moves from a position located outside of the vehicle 100 to a position located in the interior of the vehicle 100 and underneath the roof 105 of vehicle 100.

FIGS. 4A-D are a side view, bottom view, front view, and side perspective view of a working portion of the tool head 20 and connection structure 40 of tool 10 of FIG. 1. In the side view of the tool head 20, the longitudinal axis of the shorter member LAS is shown as substantially perpendicular to the longitudinal axis of the trough member LAT, and substantially parallel with the longitudinal axis of the longer member LAL. The width w of each of the shorter member 21, trough member 22, and tool head 20 can be substantially less then the length along the longitudinal axes LAS, LAT, LAL or each member, respectively. For example, the width w can be less than half of the length of each of the trough member 22 and longer member 23 taken along the longitudinal axis LAT, LAL of each member, respectively. As indicated above, the angle of inclination of the longitudinal axis of the longer member LAL can be slightly different, plus or minus 7 degrees, from 90 degrees with respect to the longitudinal axis of the trough member LAT and still be considered substantially perpendicular thereto.

The connection structure 40 can be integrally formed with the tool head 20 and be configured as a conical structure attached to (or extending integrally from) a bottom surface 220 of the trough member 22. The connection structure 40 can also include openings therein that allow attachment members, such as an upper set screw (or press fit pin, etc.) 41 and a lower pin (or set screw, etc.) 42 to pass therethrough such that the tool head 20 can be attached to an upper side of the handle 30. If the tool head 20 is a separate structure (and not integrally formed with connection structure 40), these set screws/pins 41, 42 can also be used to attach to a lower side of the tool head 20.

Figure 4D:
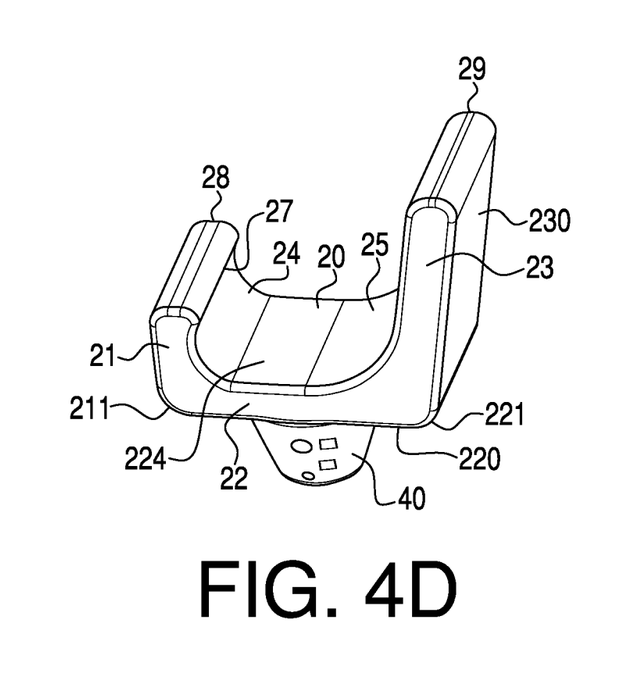
Figure 5A:
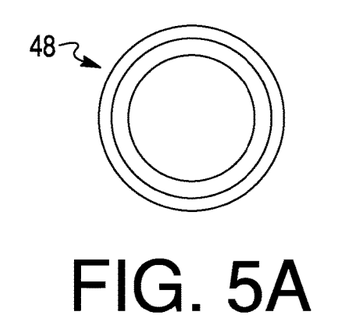
FIGS. 5A-D are a top view, side view, front view and top perspective view of a connection portion of the installation apparatus of FIG. 1.
Figure 5B:
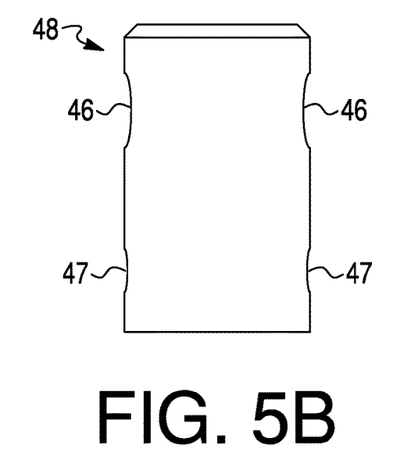
Figure 5C:
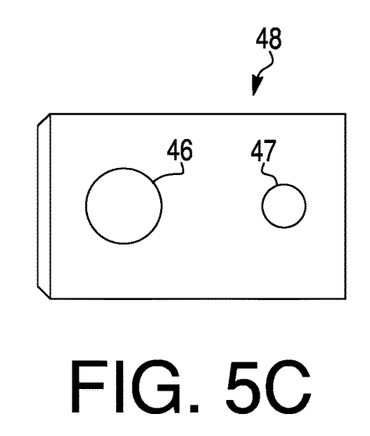
Figure 5D:
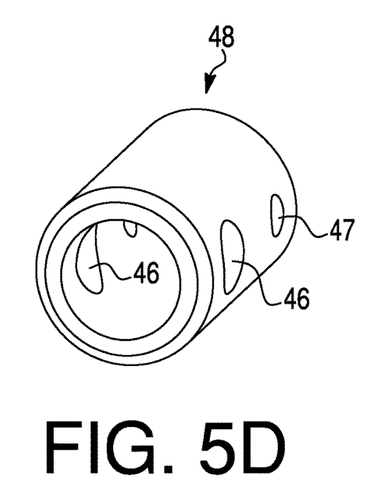

As shown in FIG. 4D, the grab lip 27 can extend along a line that represents an inflection point between a convex surface of the distal end 28 and a concave interior surface 24 of shorter member 21. The grab lip 27 can also be configured as a flange or other structure that extends and runs along an inner surface of the shorter member 21 facing the longer member 23. The grab lip 27 can also include a locking structure that is configured to positively lock the shorter member 21 to the A-pillar at a hinge point during use of the installation apparatus 10.

The installation apparatus tool 10 can also include a proximity sensor 93 such as but not limited to an inductive proximity sensor as shown in schematic form in FIG. 4A. The proximity sensor 93 can be mounted on or adjacent to the longer member 23 (or other portion of the tool head 20 in different embodiments) and can be configured to identify when the tool head 20 is in a correct position relative to the vehicle pillar 101 and/or attachment element 130 of garnish 120. The proximity sensor 93 can be configured to output a signal that is indicative of the correct or incorrect proximity of the tool head 20 such that an audible, visual, haptic or other indicator device is actuated to inform the user when the tool head 20 is in a correct or incorrect position (for example, when the longer member 23 is located adjacent the attachment element 130 of garnish 120 and ready to transmit a connective force thereto).

The controller 60 can be configured to analyze the proximity data from the proximity sensor 93 that corresponds to the proximity of the installation apparatus 10 to the vehicle pillar 101 and the torque/force data that corresponds to the predetermined torque/force threshold as noted above. The controller 60 can be configured to actuate an indicator device if the proximity data corresponds to a predetermined tool proximity threshold.

The controller 60 can also be configured to actuate both a torque/force indicator device and a proximity indicator device, such that an operator (or a defect control system) can be notified when the pillar garnish 120 is mounted in accordance with the desired specification. Accordingly, the installation apparatus 10 can analyze position data, and torque and/or force data (including maximum force experienced) so as to ensure that the garnish 120 is mounted on the vehicle pillar 101 in accordance with the desired specification. The installation apparatus 10 can also analyze a torque or force curve so as to ensure that the garnish 120 is being set properly, i.e. during the process of mounting.

The proper setting of the garnish 120 can be recorded by the controller 60. The controller 60 can be configured to record the torque and/or force data and the proximity data together with a vehicle identification data. The vehicle identification data can include data that can distinguish the vehicle from other vehicles having a respective pillar garnish 120 installed.

The combination of force/torque sensor 44 and proximity sensor 93 can reduce or avoid the number of false positives to be issued by the installation apparatus 10. For example, a proper setting of a vehicle garnish 120 may require that both (1) a proper torque/force and/or torque/force curve based on the torque/force data from the sensor 44 and analyzed by the controller 60 in mounting of the vehicle garnish 120, and (2) the proximity sensor 93 sensed proper positioning of the tool 10 relative to the vehicle pillar 101 during mounting of the garnish 120.

FIGS. 5A-D depict an attachment collet 48 that can be press fit into the connection structure 40 to provide secure attachment between the tool head 20 and the handle 30. The collet 48 can include two apertures 46, 47 through which a pin or set screw can pass or be attached in order to secure the tool head 20 to the handle 30. The collet 48 can be made from metal, or can be made of plastic, ceramic or combinations of these materials.

While certain embodiments of the invention are described above, it should be understood that the invention can be embodied and configured in many different ways without departing from the spirit and scope of the disclosed embodiments.

The installation apparatus tool 10 is described above with reference to a garnish 120 that is mounted on an A-pillar of the vehicle. However, the installation apparatus can be used to mount any aesthetic member to an appropriate structure of the vehicle. Accordingly, the installation apparatus tool 10 can be used in different applications and constructed of different geometry that matches with the particular geometry of the vehicle structure and the aesthetic member. Depending on the application of the tool, the various surfaces characterized as "flat" or "convex" or "concave" can be changed in surface geometry to correspond to that particular application of the tool 10. Thus, certain flat surface disclosed in the exemplary embodiments may be slightly concave or convex (or, non-planar) without departing from the spirit and scope of the invention. Likewise, the curved surfaces may include or comprise flat or planar portions, depending on a particular application for the tool 10.

In alternate embodiments, the sensors 44, 93 can be provided on any appropriate portion(s) of the tool handle 30, tool head 20 or connection structure 40. Different types of force sensors, torques sensors, position sensors or proximity sensors can be utilized in order to achieve the desired force and/or torque data and proximity data. Similarly, although the communication device 45 is shown as located on the connection structure 40, the location of the communication device 45 can be determined based on the particular application of the tool 10. For example, the communication device 45 can be located in the tool head 20 or in the handle 30. The proximity sensor 93 can include a marker that is placed in (or integrated into) the garnish 120, attachment element 130, or mating element 102. The proximity sensor 93 can be configured to sense the marker when the tool 10 is in a correct location with respect to the garnish 120 and/or pillar 101. Alternatively, the proximity sensor 93 can be configured to sense the material, such as a particular metal, of the attachment element 130 (or mating element 102).

The attachment element 130 and mating element 102 can be configured as a onetime clip such that the attachment element 130 cannot be removed from the mating element 102 without destroying the attachment element 130 and/or mating element 102. Alternatively, the attachment element 130 could be a connection structure that selectively connects and disconnects the garnish 120 to the pillar 101 using a type of adhesive, magnetic device, ratcheted connector, or other connective structure for securing the garnish 120 to the pillar 101.

Instead of using pins and/or set screws, the handle 30 can be attached to the tool head 20 by a suitable mechanical arrangement such as welding, brazing, adhesive, other known mechanical fasteners, friction fit, mating threads formed in the handle 30, tool head 20, and/or on the connection structure 40, or any combination thereof.

The controller 60 can be located in the handle 30, connection structure 40, tool head 20 or other location, if desired. The controller 60 can also be in electrical communication with an electric power source. The power source can be one or more batteries mounted within the tool 10 or in the controller 60. Alternate embodiments of the installation apparatus 10 can include a controller 60 that is electrically connected to an external electrical power source by an electric wire that is connected to and extends away from controller 60.

Alternative embodiments can include each of the long member 23, trough member 22, and shorter member 21 formed as separate pieces and attached together using mechanical fasteners, welds, adhesives, threaded elements, etc. The members 21, 22, and 23 can include multiples of each other (each having a different shape or size) and can be interchangeable for various applications of the tool 10.

The controller 60 and the sensors 44, 93 can be supplied with power from a battery or a plurality of battery cells housed within any portion of the tool 10, or via wire connection to a power source.

Features, elements and/or characteristics described with respect to one embodiment of the disclosure may be variously used with other embodiments of the disclosure as may be desired.

Various components of embodiments of the disclosure can be made from any of a variety of materials including, for example, steel, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques can be utilized. Also, metal stamping or cutting can be utilized. The various components can also be created using 3-D printing, if desired.

The subject matter has been described in detail with reference to exemplary embodiments thereof. However, it will be apparent to one skilled in the art that various changes can be made, and equivalents employed, without departing from the scope of the invention.

What is claimed is:

1. An installation apparatus for mounting a garnish having at least one attachment element onto a pillar frame structure of a vehicle, the installation apparatus comprising:
   a handle portion;
   an installation portion located at one end of the handle portion and configured to install the attachment element onto the pillar frame structure of the vehicle, wherein the installation portion includes a shorter member configured to engage the vehicle from a bottom area of the pillar frame structure to create a hinge point, a longer member configured to engage the garnish and attachment element, and a trough member having a first end that the longer member extends substantially perpendicularly from and an opposite end that the shorter member extends substantially perpendicularly from, the shorter member, the longer member, and the trough member collectively form a J-shape, wherein the garnish is installed to the pillar frame structure when pivoting the handle of the apparatus about the hinge point, and the shorter member is connected to the trough member at a first end of the shorter member, and terminates at a second end, and the second end includes a concave surface that faces the longer member such that a grab lip is located at the second end of the shorter member and faces the longer member.

2. The installation apparatus of claim 1, wherein the installation portion is configured to deform the attachment element when attaching the attachment element to the pillar frame structure.

3. The installation apparatus of claim 1, wherein the installation portion is configured to engage the pillar frame structure formed as an A-pillar of the vehicle.

4. The installation apparatus of claim 1, wherein the trough member of the installation portion includes a bottom surface located opposite the shorter member and the longer member, wherein
   the bottom surface is attached to the handle portion.

5. The installation apparatus of claim 4, wherein the shorter member is connected to the trough member at a first end of the shorter member, and terminates at a second end, and the second end includes a concave surface that faces the longer member such that a grab lip is located at the second end of the shorter member.

6. The installation apparatus of claim 4, wherein the longer member and trough member of the installation portion each have a longitudinal axis that intersect and are located within a first plane.

7. The installation apparatus of claim 6, wherein a width of the installation portion that extends perpendicular from the first plane is substantially less than a length of the longer member along the longitudinal axis of the longer member.

8. The installation apparatus of claim 6, wherein a width of the installation portion that extends perpendicularly from either side of the first plane is substantially less than a length of the trough member along the longitudinal axis of the trough member.

9. The installation apparatus of claim 4, further comprising a sensor configured to measure at least one of a torque and force applied by the installation apparatus to the attachment element, and the sensor is located at one of the handle portion and trough member.

10. The installation apparatus of claim 9, further comprising a communication device configured to transmit information from the sensor to a remote device, the remote device configured to compare the information received from the sensor to a standard in order to determine whether attachment of the attachment element onto the pillar frame structure of the vehicle is acceptable.

11. An installation kit for mounting a garnish onto an A-pillar of a vehicle, the installation kit comprising:
    a garnish configured to mount onto the A-pillar;
    an attachment structure configured to attach the garnish to the A-pillar;
    an installation apparatus having,
        a handle,
        an installation tool located at one end of the handle and configured to install the attachment element onto the A-pillar of the vehicle, wherein
        the installation tool includes a shorter member configured to engage the A-pillar from a bottom area of the A-pillar to create a hinge point, a longer member configured to engage the garnish and attachment element, and a trough member having a first end that the longer member extends substantially perpendicularly from and an opposite end that the shorter member extends substantially perpendicularly from,
        the shorter member, the longer member, and the trough member collectively form a j-shape,
        wherein the garnish is installed to the A-pillar when pivoting the handle of the installation apparatus about the hinge point.

12. The installation kit of claim 11, wherein the attachment structure is a one time attachment structure configured to deform when attached to the pillar frame structure.

13. The installation kit of claim 11, wherein the trough member of the installation tool includes a bottom surface located opposite the shorter member and the longer member, wherein
    the bottom surface is attached to the handle.

14. The installation kit of claim 13, wherein the shorter member is connected to the trough member at a first end of the shorter member, and terminates at a second end, and the second end includes a concave surface that faces the longer member such that a grab lip is located at the second end of the shorter member.

15. The installation kit of claim 11, wherein the installation kit includes,
    a sensor configured to determine at least one of a force and a torque applied to the garnish or attachment structure during use of the installation kit, and
    a communication device configured to communicate with a remote server information associated with the amount of at least one of force and torque sensed by the sensor.

16. The installation kit according to claim 11, further comprising:
    a sensor configured to sense at least one of a force and a torque applied to the garnish or attachment structure during use of the installation kit;
    at least one of an indicator light and an indicator speaker; and
    a controller configured to inform a user of an install complete condition by at least one of illuminating the indicator light and causing a sound to emit from the speaker when at least one of force information and torque information sensed by the sensor corresponds to at least one of a predetermined force threshold and predetermined torque threshold.

17. A method of using the installation kit of claim 11, comprising:
placing the installation tool into an opening of the vehicle;
connecting the shorter member of the installation tool to a lower portion of the A-pillar to create the hinge point between the installation tool and the A-pillar;
rotating the handle of the installation tool such that the longer member contacts the garnish and causes the attachment structure to connect to a mating structure located between the A-pillar and the garnish to secure the garnish to the A-pillar, wherein rotating the handle includes rotating the handle towards an interior of the vehicle via the opening.

18. A method for installing a garnish having at least one attachment structure onto a pillar frame structure of a vehicle by using the installation apparatus of claim 1, the method comprising:
providing the installation apparatus;
placing the installation portion into an opening in the vehicle;
connecting the shorter member of the installation portion to a lower portion of the pillar frame structure to create the hinge point between the installation portion and the pillar frame structure;
rotating the handle of the installation apparatus such that the longer member contacts the garnish and causes the attachment structure to connect to a mating structure located between the pillar frame structure and the garnish to secure the garnish to the pillar frame structure, wherein rotating the handle includes rotating the handle towards an interior of the vehicle via the opening.

19. An installation apparatus for mounting a garnish having at least one attachment structure onto an A-pillar frame structure of a vehicle, the installation apparatus comprising:
a handle portion;
an installation portion located at one end of the handle portion and configured to install the attachment structure onto the A-pillar frame structure of the vehicle, wherein
the installation portion includes a trough member, a shorter member extending from one end of the trough member and configured to engage the vehicle from a bottom area of the A-pillar frame structure to create a hinge point, and a longer member extending from an opposite end of the trough member and configured to engage the garnish and attachment structure,
the shorter member, the longer member, and the trough member collectively form a j-shape, wherein
the garnish is installed to the A-pillar frame structure when pivoting the handle of the apparatus about the hinge point,
the longer member of the installation portion extends substantially perpendicularly from the trough member, and the shorter member of the installation portion extends substantially perpendicularly from the trough member, and the shorter member is connected to the trough member at a first end of the shorter member, and terminates at a second end, and the second end includes a concave surface that faces the longer member such that a grab lip is located at the second end of the shorter member and faces the longer member.

20. The installation apparatus of claim 19, wherein the longer member and trough member of the installation portion each have a longitudinal central axis that intersect and are located within a first plane, and a width of the installation portion that extends perpendicularly from the first plane is substantially less than a length of the longer member along the longitudinal central axis of the longer member.

\* \* \* \* \*